United States Patent
Lee et al.

(10) Patent No.: US 7,508,098 B2
(45) Date of Patent: Mar. 24, 2009

(54) TRANSFER APPARATUS

(75) Inventors: Suk-won Lee, Kunpo-si (KR); Byung-il Ahn, Seoul (KR); Dong-woo Kang, Daejeon (KR); Ki-hyun Kim, Daejeon (KR); Dae-gab Gweon, Daejeon (KR); Dong-min Kim, Daejeon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 273 days.

(21) Appl. No.: 11/057,144

(22) Filed: Feb. 15, 2005

(65) Prior Publication Data

US 2005/0184618 A1    Aug. 25, 2005

(30) Foreign Application Priority Data

Feb. 19, 2004    (KR) ............... 10-2004-0011086

(51) Int. Cl.
  *H02K 41/00*    (2006.01)
(52) U.S. Cl. ........................................ 310/12
(58) Field of Classification Search .......... 310/12, 310/13, 14, 15
  See application file for complete search history.

(56) References Cited

U.S. PATENT DOCUMENTS

| | | | | |
|---|---|---|---|---|
| 5,196,745 | A * | 3/1993 | Trumper | 310/12 |
| 6,316,901 | B2 * | 11/2001 | Lee | 318/649 |
| 2001/0031191 | A1 * | 10/2001 | Korenaga | 414/200 |
| 2002/0149270 | A1 * | 10/2002 | Hazelton | 310/12 |
| 2003/0132671 | A1 | 7/2003 | Gweon et al. | |
| 2004/0245861 | A1 * | 12/2004 | Miyajima et al. | 310/12 |

FOREIGN PATENT DOCUMENTS

| | | |
|---|---|---|
| JP | 5-237787 | 9/1993 |
| JP | 11-307425 | 11/1999 |
| JP | 2001-230305 | 8/2001 |
| JP | 2001-267220 | 9/2001 |
| JP | 2002-104656 | 4/2002 |
| JP | 2003-45785 | 2/2003 |
| JP | 2003-167082 | 6/2003 |
| KR | 10-381975 | 4/2003 |
| KR | 10-407897 | 11/2003 |

OTHER PUBLICATIONS

Japanese Office Action dated Jan. 15, 2008 issued in JP 2005-044803.

* cited by examiner

*Primary Examiner*—Nguyen N Hanh
(74) *Attorney, Agent, or Firm*—Stanzione & Kim, LLP

(57) ABSTRACT

A transfer apparatus includes at least four fine actuators each having a coil assembly with a wound coil, and a pair of movable magnets having different polarities and spaced from each other to interpose the coil assembly therebetween, a coil supporter to support the at least four coil assemblies so that the fine actuators are arranged in a pair of groups thereof symmetrically with respect to a predetermined straight line, a magnet supporter to support the at least four movable magnets corresponding to the respective coil assemblies, and a controller to control the fine actuator to move one of the coil supporter and the magnet supporter with respect to the other one. With this configuration, a transfer apparatus can perform a super-precision positioning control by decreasing a positioning control error.

20 Claims, 9 Drawing Sheets

TRANSFER APPARATUS

CROSS-REFERENCE TO RELATED APPLICATIONS

This application claims the benefit of Korean Patent Application No. 2004-11086, filed Feb. 19, 2004, in the Korean Intellectual Property Office, the disclosure of which is incorporated herein by reference.

BACKGROUND OF THE INVENTION

1. Field of the Invention

The present general inventive concept relates to a transfer apparatus, and more particularly, to a transfer apparatus having an improved structure to provide a super-precision transfer.

2. Description of the Related Art

Generally, a super-precision transfer apparatus is employed in a scanning apparatus for inspecting a semiconductor wafer, a liquid crystal display (LCD) panel or the like, and also employed in a semiconductor machining, a super-precision machining, etc.

Such a super-precision transfer apparatus includes a supporter, such as a frame mainly supporting a semiconductor wafer or the like, an actuator connected to the supporter and driving the supporter to move with respect to a reference plate; and a controller to precisely control the actuator.

There are various actuators typically used for a precise drive by employing an electric motor, a piezoelectric element, electromagnetic induction, etc. Particularly, a voice coil motor (VCM) using a linear motor is used as the precise actuator employing the electromagnetic induction.

The VCM is an actuator using a vibration mechanism of a speaker, following a principle that a permanent magnet is moved by a force in a direction orthogonal to a magnetic field and an electric current according to the Fleming's left hand law when the electric current flows in a voice coil located in the magnetic field due to the permanent magnet. Further, the VCM actuator is classified into a coil movable type and a magnet movable type. That is, in the coil movable type actuator, a voice coil is movable with respect to a stationary permanent magnet, while in the magnet movable type actuator, a permanent magnet is movable with respect to a stationary voice coil.

As a conventional precise transfer apparatus, a stage apparatus for a precise actuator using a magnet movable type VCM is disclosed in Korean Patent No.: 10-0407897 (Publication No.: 2003-20787).

As shown in FIGS. 1 and 2, such a stage apparatus 100, by way of example of a conventional precise transfer apparatus, includes an induction unit 10 which is stationarily seated in a through portion of a plate 20 and has a hollow shaft 12 and a coil 11 provided at opposite sides of the hollow shaft 12, which are exposed through the through portion, and a movable unit 30, which includes a pair of yokes 32 disposed symmetrically with the hollow shaft 12 and being straight movable or rotatable with respect to the hollow shaft 12 due to a magnetic field formed by the coil 11, and a pair of movable magnets 31 having different polarities and respectively attached to the yokes 32 using a magnetic force to interpose the coil 11 between the movable magnets 31.

Here, three induction units 10 are triangularly arranged in the plate 20 at an angle of 120° therebetween, and the movable magnet 31 is a permanent magnet. That is, three VCMs having the same motive power are equiangularly arranged on the plate 20.

Thus, in the conventional stage apparatus 100, the movable magnet 31 is driven to move with respect to the coil 11 by flowing the electric current in the coil 11 of the induction unit 10. Further, in the conventional stage apparatus 100, the three induction units 10 are arranged to form an equiangular triangle structure, and the movable unit 30 is straight movable (X and Y-directions) or rotatable (θ-direction) with respect to the plate 20 by selectively applying the electric current to at least one of three coils 11 provided in the induction coil 10.

However, in the conventional stage apparatus, because three induction units are arranged to form an equiangular triangle structure, there is generated a difference between the straight movements of the movable units in the X- and Y-directions. For example, referring to FIG. 1, the X-directional straight movement of the movable unit is based on an X-directional vector component of a resultant force of F1, F2 and F3, and the Y-directional straight movement of the movable unit is based on a Y-directional vector component of a resultant force of F2 and F3, so that the X-directional straight movement is greater than the Y-directional straight movement. Hence, the difference between such straight movements results in making it hard to decrease a positioning control error when a super-precision positioning control is required.

Further, in the conventional stage apparatus, when the movable units are driven to move in one of the X- and Y-directions, the movable unit is also driven to move in the other direction. For example, when the movable units are driven to move in the X-direction, some movable units are driven to move in the X-direction as well as the Y-direction, so that he movable units are driven to move in a direction different from the X-direction, thereby resulting in making it difficult to decrease the positioning control error when the super-precision positioning control is required.

SUMMARY OF THE INVENTION

Accordingly, it is an aspect of the present general inventive concept to provide a transfer apparatus which performs a super-precision positioning control by decreasing a positioning control error.

Additional aspects and/or advantages of the general inventive concept will be set forth in part in the description which follows and, in part, will be obvious from the description, or may be learned by practice of the general inventive concept.

The foregoing and/or other aspects of the present general inventive concept are achieved by providing a transfer apparatus that may include at least four fine. actuators each having a coil assembly having a wound coil and each having a pair of movable magnets having different polarities and spaced apart from each other to interpose the coil assembly therebetween, a coil supporter to support the at least four coil assemblies so that the fine actuators are arranged in a pair of groups thereof symmetrically with respect to a predetermined straight line, a magnet supporter to support the at least four movable magnets corresponding to the respective coil assemblies, and a controller to control the fine actuator to move one of the coil supporter and the magnet supporter with respect to the other one.

According to an aspect of the general inventive concept, in each group of the coil assemblies, one coil corresponding to the movable magnet may have a current direction being orthogonal to a current direction of the other coil.

According to another aspect of the general inventive concept, the magnet supporter may be provided with a plurality of air bearings to allow the magnet supporter to be spaced from a predetermined bottom surface and to be movable relative to the bottom surface.

According to another aspect of the general inventive concept, the controller can control the fine actuator to move the magnet supporter relative to the coil supporter 140 with three degrees of freedom with respect to a surface of the magnet supporter.

According to yet another aspect of the general inventive concept, the magnet supporter can be finely moved with respect to the coil supporter within a positioning control error of about ±50 nm.

According to still another aspect of the invention, the transfer apparatus may further include a coarse actuator connected to one of the magnet supporter and the coil supporter to allow the one of the magnet supporter and the coil supporter to move more coarsely than when driven by the fine actuator.

According to still another aspect of the general inventive concept, the coarse actuator may include a mover having a movable coil winding thereon and connected to the coil supporter, and a stator having a pair of magnets spaced from each other to interpose the mover therebetween and having different polarities.

According to still another aspect of the general inventive concept, the transfer apparatus may further include a guide supporting the stator, and a sliding guide connected to the coil supporter and connected to the guide to be transferred along the guide integrally with the coil supporter.

According to yet another aspect of the general inventive concept, the sliding guide can be provided with a plurality of second air bearings to allow the sliding guide to be transferred while being spaced from the guide.

According to yet another aspect of the general inventive concept, at least one of the sliding guide and the magnet supporter can be provided with a stopper to limit a movement of the sliding guide and the magnet supporter within a predetermined range.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
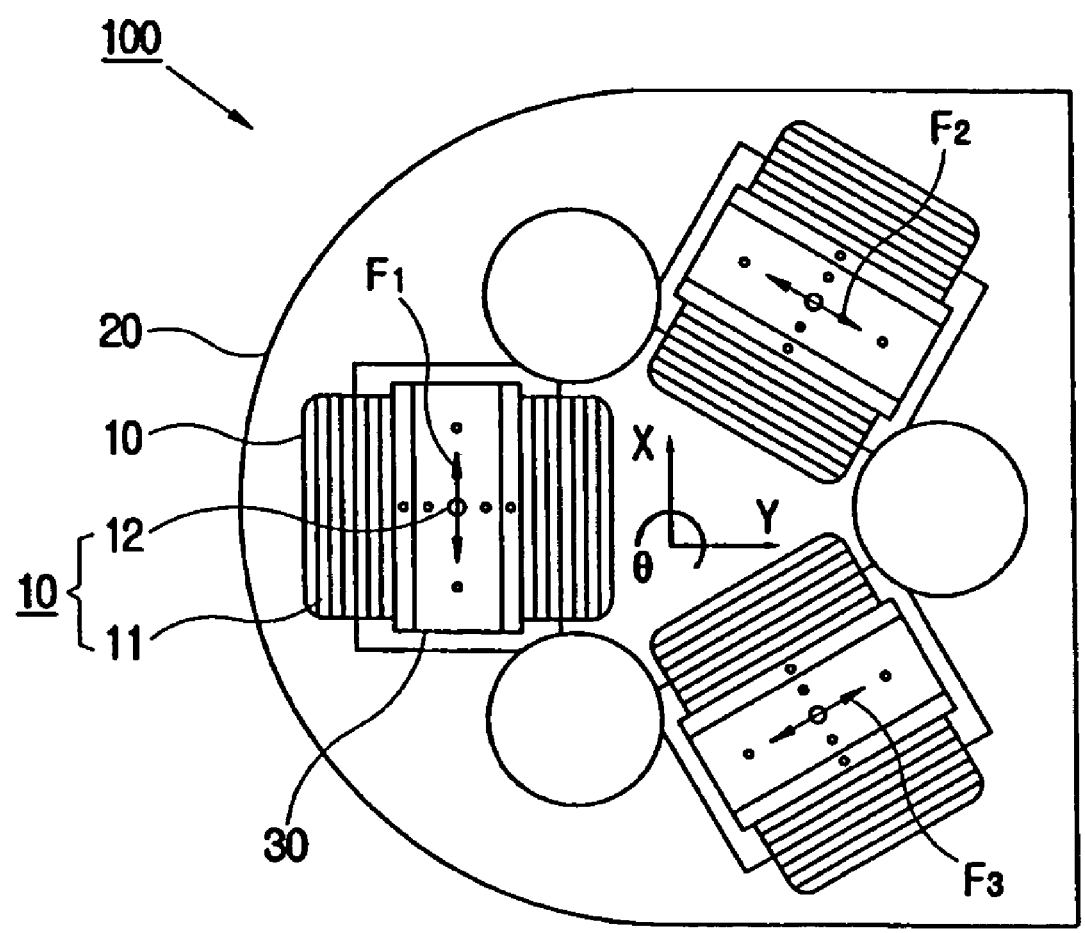
FIG. 1 is a plan view of a conventional transfer apparatus.
Figure 2:
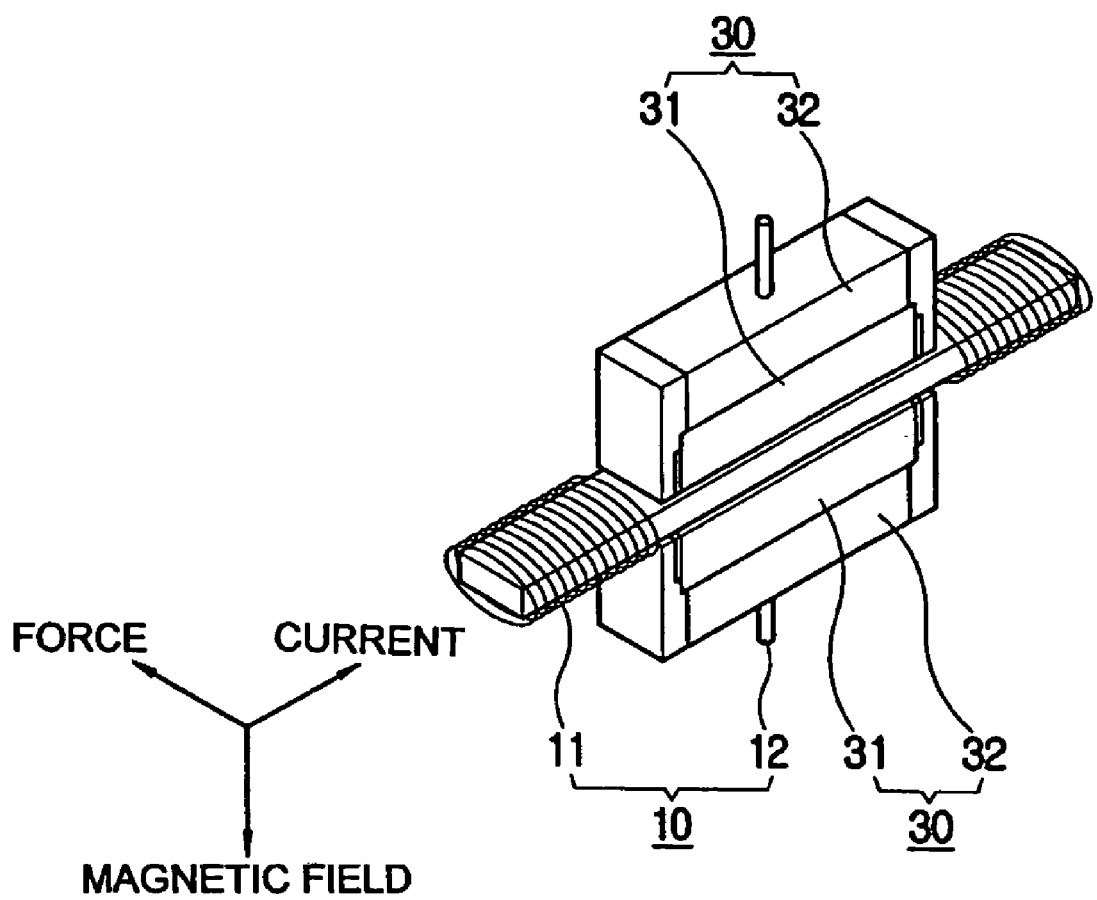
FIG. 2 is a perspective view of an actuator provided in the conventional transfer apparatus of FIG. 1.
Figure 3:
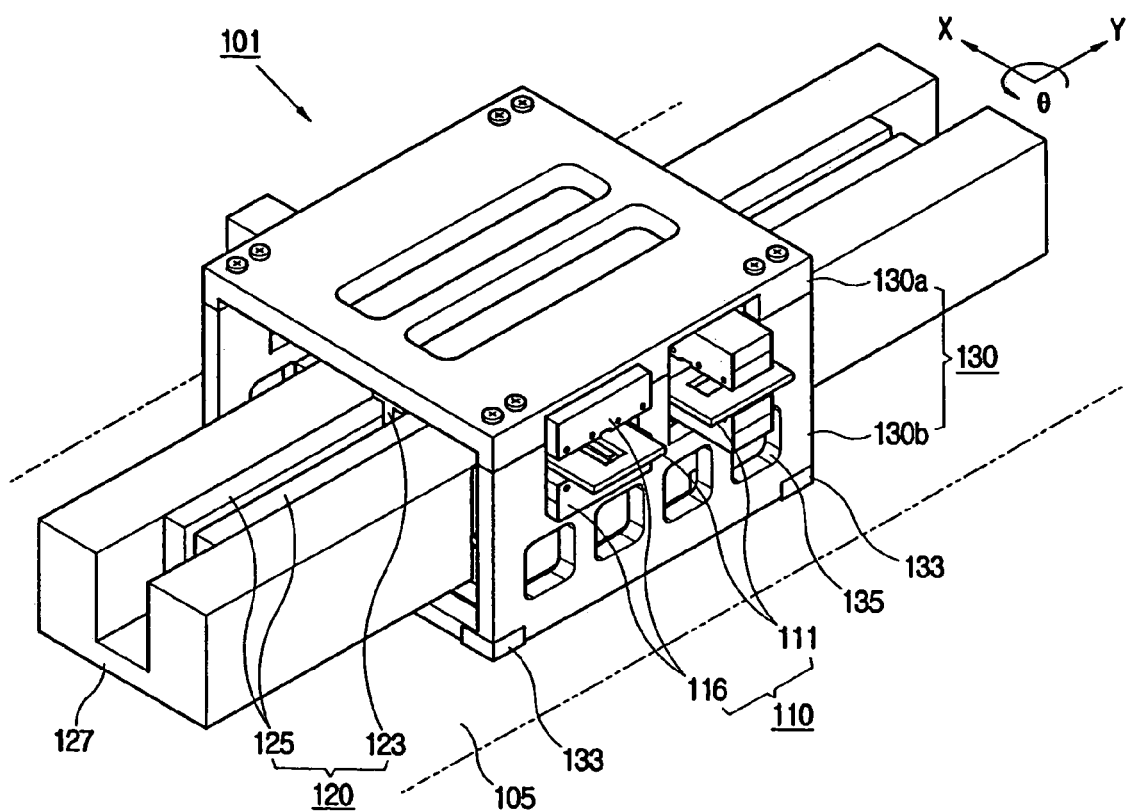
FIG. 3 is a perspective view of a transfer apparatus according to an embodiment of the present general inventive concept.
Figure 4:
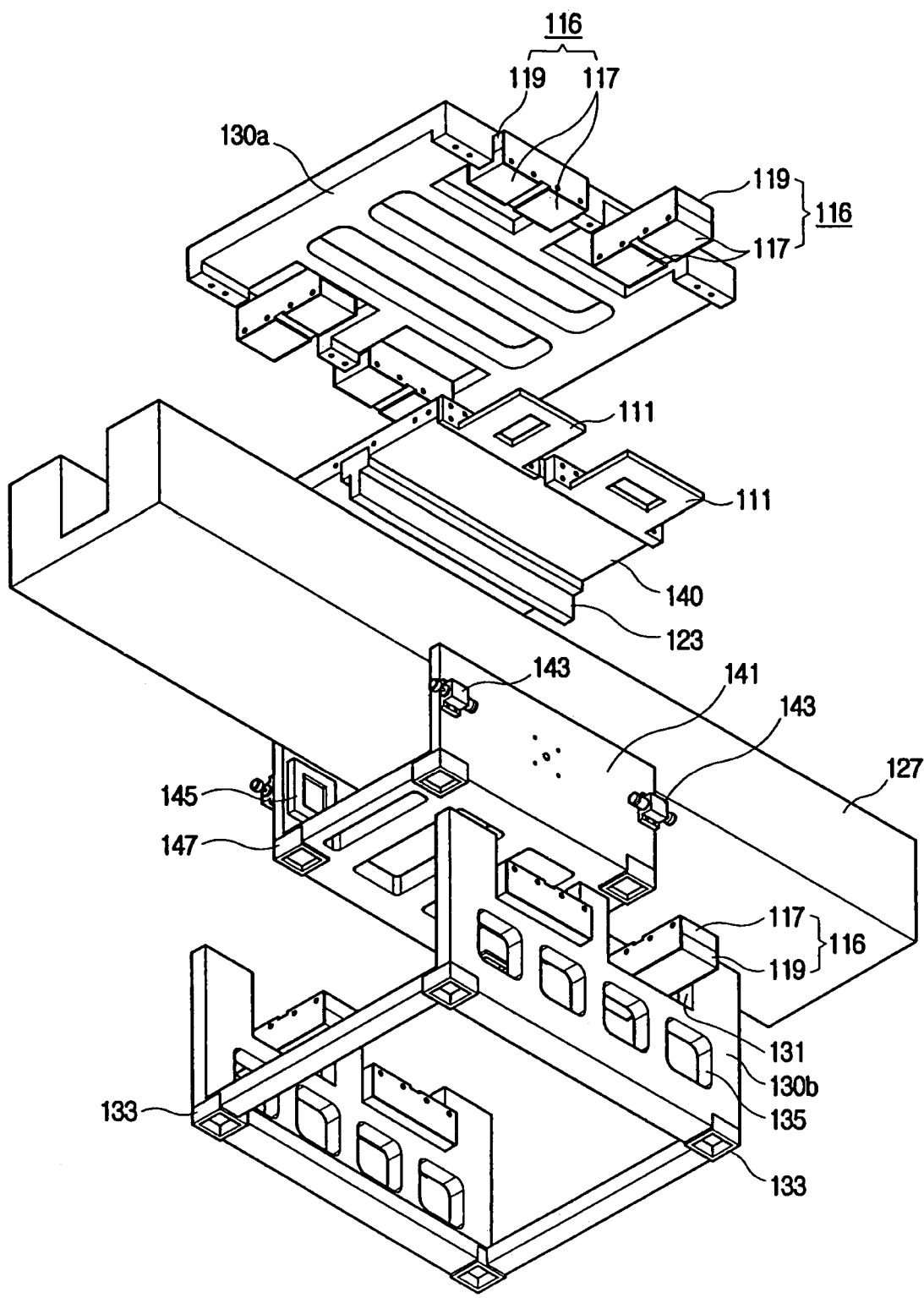
FIG. 4 is an exploded perspective view of the transfer apparatus of FIG. 3.
Figure 5:
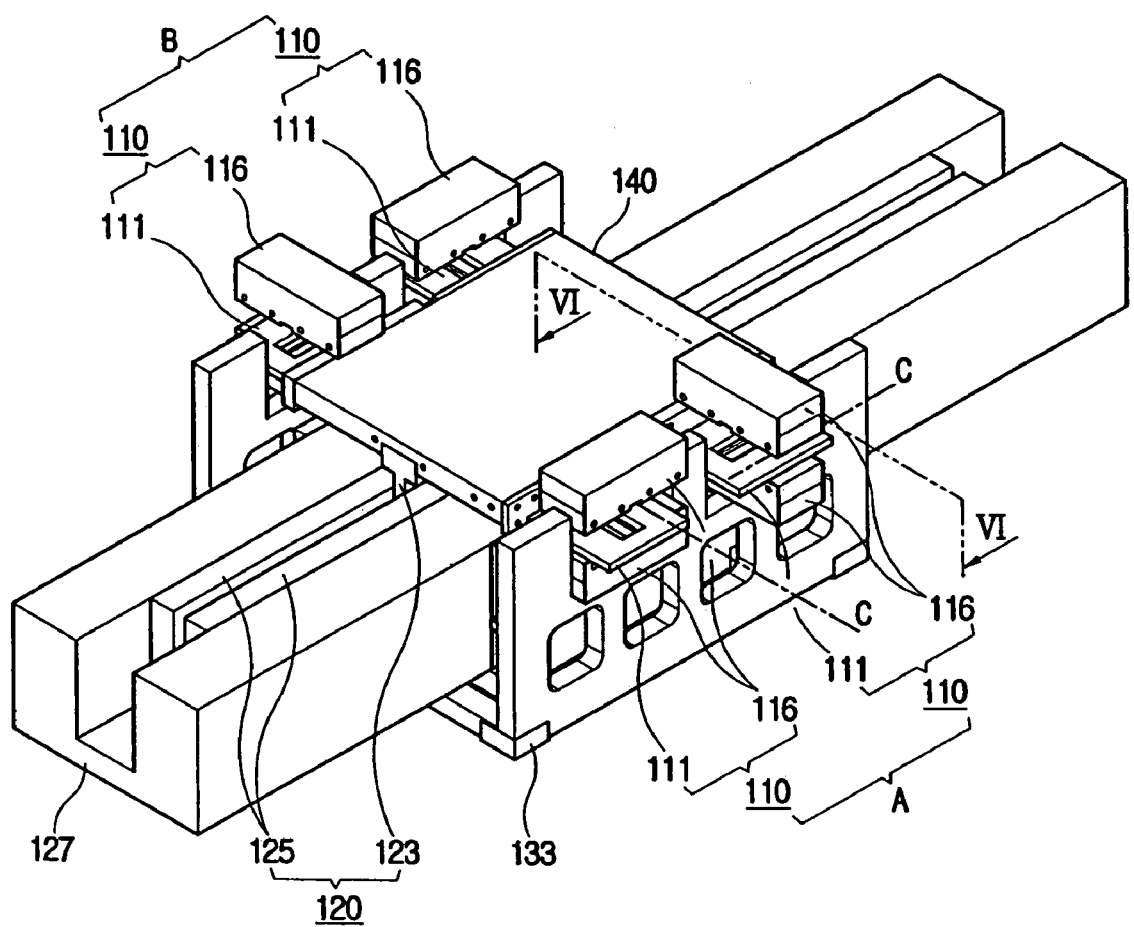
FIG. 5 is a partially assembled perspective view of the transfer apparatus of FIG. 3 without the first magnet supporter.

Reference will now be made in detail to the embodiments of the present general inventive concept, examples of which are illustrated in the accompanying drawings, wherein like reference numerals refer to like elements throughout. The embodiments are described below in order to explain the present general inventive concept by referring to the figures.

Figure 6:
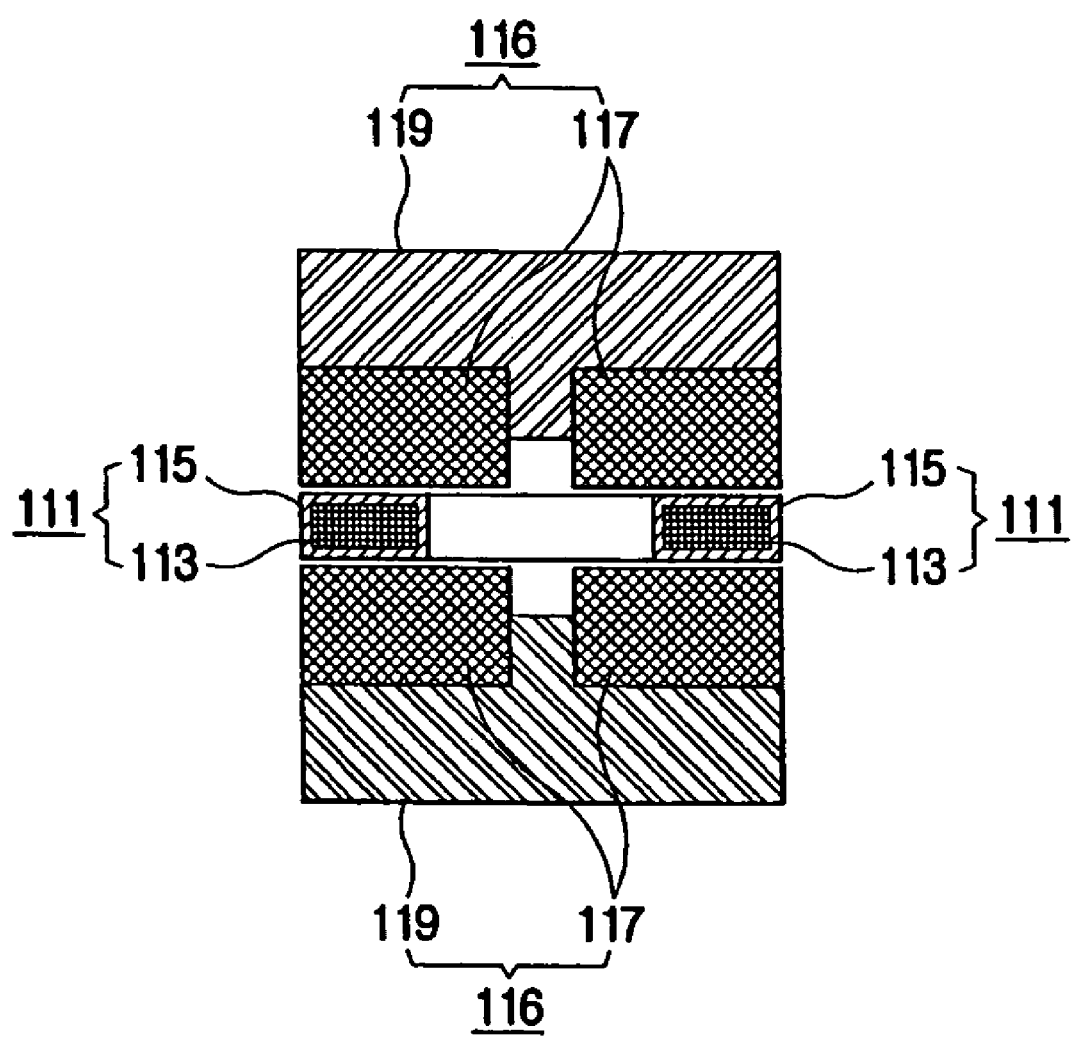
FIG. 6 is a sectional view of a fine actuator of the transfer apparatus, taken along a line VI-VI of FIG. 5.

As shown in FIGS. 3 through 6, a transfer apparatus 101 according to an embodiment of the present general inventive concept may include at least four fine actuators 110 each having a coil assembly 111 and a pair of movable magnets 117, and having different polarities and spaced apart from each other to dispose the coil assembly 111 therebetween, a coil supporter 140 to support at least four coil assemblies 111 by forming a pair of groups A and B symmetrically with respect to a predetermined straight line, a magnet supporter 130 to support at least four movable magnets 117 corresponding to the respective coil assemblies 111, and a controller (not shown) to control the fine actuator 110 to move one of the coil supporter 140 and the magnet supporter 130 with respect to the other one. Further, the transfer apparatus 101 may further include a coarse actuator 120 connected to one of the magnet supporter 130 and the coil supporter 140 to allow the one of the magnet supporter 130 and the coil supporter 140 to move more coarsely than when driven by the fine actuator 110. As shown in FIG. 6, the pair of movable magnets 117 are disposed on upper and lower sides of the coil assembly 111.

The fine actuator 110 may include a voice coil motor (VCM) using a vibration mechanism of a speaker. Here, the VCM can be developed by applying the vibration mechanism of the speaker to an actuator, such as the fine actuators 110 or the coarse actuators 120, wherein a permanent magnet is moved by a force in a direction orthogonal to a magnet field and an electric current according to the Fleming's left hand law when the electric current flows in a voice coil located in the magnetic field due to the permanent magnet. In this embodiment, the four fine actuators 110 can be connected to the magnet supporters 130 and the coil supporters 140, respectively, thereby driving the magnet supporters 130 to finely move with respect to the coil supporters 140. In an aspect of the this embodiment each fine actuator 110 can drive the magnet supporter 130 to finely move with respect to the coil supporter 140 within a positioning control error of about ±50 nm. However, the fine actuator 110 may drive the coil supporter 140 to finely move with respect to the magnet supporter 130. Although the four fine actuators 110 are illustrated in this embodiment, six or more even number of fine actuators 110 may be provided. Further, the fine actuators 110 are symmetrically disposed with respect to a predetermined line, such as a longitudinal axis of a mover 123 of the coarse actuator 120 (to be described later), to form two pairs of groups A and B at each opposite side of the magnet and coil supporters 130 and 140.

The coil assembly 111 may include a coil jig 115, and a coil 113 provided in the coil jig 115. However, the coil assembly 111 may include the coil 113 wound on a core without the coil jig 115. The coil jig 115 may have a hollow "☐"-shape, and the coil 113 can be wound inside the hollow structure. The coil jig 115 can be connected and supported to the coil supporter 140 by a screw or the like. Further, two pairs of coil assemblies 111 can be provided at the opposite sides of the coil supporter 140, three or more pairs of coil assemblies 111 may be provided at the opposite sides of the coil supporter 140 corresponding to the fine actuators 110. Additionally, one of the coils 113 of the respective coil assemblies 111 associated with the movable magnets 117 in each group A or B can have a current direction C being orthogonal to another current direction C of the other coil 113 (refer to FIG. 5). In another aspect of this embodiment, one of the coil assemblies 111 in each group A or B has the current direction C to move the movable magnet 117 in the X-direction, and the other coil 113 has the current direction C to move the movable magnet 117 in the Y-direction. That is, the movable magnet 117 can move in a direction orthogonal to the current direction C of the coil 113, so that two coils 113 of the pair of coil assemblies 111 are arranged to have the current directions C aligned with the Y- and X-directions, respectively. Thus, the movable magnets 117 can move in the X- and Y-directions by the pair of coil assemblies 111 arranged in the Y- and X-directions in each group A or B, respectively.

The movable magnet 117 can be supported by a yoke 119 and connected to the magnet supporter 130. Hereinafter, the yoke 119 and the movable magnet 117 connected with the yoke 119 is collectively called a magnet assembly 116. The pair of movable magnets 117 can be provided to correspond to the respective coils 113 wound in the coil jig 115. That is, two movable magnets 117 can be supported by the yokes 119 at the opposite sides of each coil assembly 111, respectively. Further, the current directions C of the coils 113 wound inside each coil jig 115 can be opposite to each other, so that the two movable magnets 117 provided at one side of each coil assembly 111 are spaced from each other and having different polarities. Similarly, the pair of movable magnets 117 interposing each coil 113 therebetween are also disposed to face each other with different polarity. Here, the movable magnet 117 may be a permanent magnet that needs no power supply. Thus, flux density between the pair of movable magnets 117 can be kept uniform (refer to FIGS. 5 and 6). As shown in FIG. 6, the two movable magnets 117 are coupled to the yoke 119 and spaced apart from each other to correspond to respective coil assemblies 111.

The coil supporter 140 may have a shape of a rectangular plate. At the opposite sides of the coil supporter 140 can be provided two pairs of coil assemblies 111 which are symmetrically disposed with respect to a predetermined line, such as the longitudinal axis of the mover 123 of the coarse actuator 120 (to be described later). Further, the mover 123 can be coupled to a bottom of the coil supporter 140.

The magnet supporter 130 may include a first magnet supporter 130a shaped like a rectangular plate, and a second magnet supporter 130b coupled to the first magnet supporter 130b by a screw. Further, the magnet supporter 130 can be provided with a plurality of first air bearings 133 to control the magnet supporter 130 to be spaced from a predetermined bottom surface 105 and be movable relative to the bottom surface 105.

The first magnet supporter 130a can be shaped like a rectangular plate and is coupled with four movable magnets 117 and disposed on one side of four pairs of movable magnets 117. That is, the first magnet supporter 130a can be coupled by the yokes 119 with four movable magnets 117 disposed on an upper side of four pairs of movable magnets 117, to correspond to four coil assemblies 111 (refer to FIG. 4). Further, the first magnet supporter 130a can be employed in a scanning apparatus to inspect a semiconductor wafer, a liquid crystal display (LCD) panel or the like, and also can be employed in a semiconductor machining, a super-precision machining, etc., which requires a super-precision positioning control.

The second magnet supporter 130b may have a "U"-shape to accommodate a sliding guide 141 (to be described later) therein and can be coupled with four movable magnets 117 disposed on the other side of the four pairs of movable magnets 117. That is, the second magnet supporter 130b can be formed with four movable magnet supporting portions 131 and coupled by the yokes 119 with four movable magnets 117 disposed on a lower side of the four pairs of movable magnets 117 to correspond to four coil assemblies 111 (refer to FIG. 4). Further, the second-magnet supporter 130b can be provided with the plurality of first air bearings 133 on a bottom thereof.

Further, the first and second magnet supporters 130a and 130b can be formed with a plurality of through portions 135 to reduce a weight thereof. The formation of the through portions 135 can reduce the weight of the magnet supporter 130, so that the fine actuator 110 can be easily controlled.

The movable magnet supporting portions 131 can be formed by cutting the opposite sides of the second magnet supporter 130b so as to accommodate the lower movable magnets 117 and the coil assemblies 111. Further, a width of the movable magnet supporting portion 131 can be larger than the width of the coil assembly 111, so that the movable magnet 117 is movable relative to the coil assembly 111 within a predetermined distance. That is, a maximum movable distance of the movable magnet 117 relative to the coil assembly 111 can be within approximately 3 mm~5 mm, and the width of the movable magnet supporting portions 131 can be larger than a sum of the width of the coil assembly 111 and the maximum movable distance of the movable magnet 117.

The first air bearing 133 can inject a pressed air onto the bottom surface 105 to control the bottom of the second magnet supporter 130b to levitate from the bottom surface 105 at a predetermined distance. Thus, the first air bearing 133 can control the second magnet supporter 130b to be transferred along the bottom surface 105 without a friction between the second magnet supporter 130b and the bottom surface 105.

The controller (not shown) can be connected to the fine actuators 110 and can control the magnet supporter 130 to move relative to the coil supporter 140. That is, the controller can be connected to the respective coils 113 of the fine actuators 110 and control the electric current being supplied to the coils 113, thereby adjusting a movement of the movable magnet 117 to control a movement of the magnet supporter 130. In an aspect of the general inventive concept, the controller can control the fine actuator 110 to move the magnet supporter 130 relative to the coil supporter 140 with three degrees (X, Y, θ) of freedom with respect to a surface of the magnet supporter 130.

The coarse actuator 120 may include the mover 123 having a movable coil (not shown) thereon and connected to the coil supporter 140, and a pair of magnet stators 125 spaced apart from each other, having different polarities, and interposing the mover 123 therebetween. Further, the coarse actuator 120 may move according to a principle that a force is generated in a direction orthogonal to a magnet field and the electric current according to the Fleming's left hand law when the electric current flows in the mover 123 interposed between the pair of stators 125. Here, the stator 125 can be a permanent magnet. Further, the coarse actuator 120 may include a guide 127 to support the stators 125, and a sliding guide 141 integrally connected to the coil supporter 140 to transfer the mover along the guide 127. In another aspect of the general inventive concept, the coarse actuator 120 can control a maximum movable distance of the mover 124 relative to the stator 125 to be approximately 500 mm, and a positioning control error of the mover 123 to be within about ±50 nm.

The mover 123 may include the movable coil wound therein side and can be placed between the pair of stators 125. Further, an upper portion of the mover 123 may be coupled to the bottom of the coil-supporter 140 by a screw or the like. Thus, the mover 123 can reciprocate between the stators 125 along a longitudinal direction of the stators 125 when the controller controls the electric current to be applied to the mover 123.

In this embodiment, the stator 125 may be a permanent magnet, but may be an electromagnet that is magnetized by a supplied electric power. Further, the stator 125 can be connected to the guide 127 to be fastened to the bottom surface 105.

The guide 127 can be placed outside the stator 125 to support the stator 125. Further, the guide 127 can be connected to the sliding guide 141 to guide the sliding guide 141.

The sliding guide 141 may have a "U"-shape to accommodate the guide 127. Further, an upper portion of the sliding guide 141 can be coupled to the coil supporter 140 by a screw or the like. The sliding guide 141 can be provided with a plurality of second air bearings 145 to control the sliding guide 141 to levitate from the guide 127 and to be transferred without a friction therebetween. Additionally, a bottom of the sliding guide 141 can be provided with a plurality of third air bearings 147 functioning like the first bearing 133 provided in the second magnet supporter 130. Here, the second and third air bearings 145 and 147 are similar to the first air bearing 133, so descriptions thereof will be omitted. Furthermore, at least one of the sliding guide 141 and the magnet supporter 130 can be provided with a stopper 143 to limit a movement of the sliding guide 141 and the magnet supporter 130 within a predetermined range.

The stopper 143 can be provided in plural on the sliding guide 141 and can prevent the sliding guide 141 from moving beyond the predetermined range. The stopper 143 can become in contact with a stopper block (not shown) provided on opposite sides of the guide 127 so as to prevent the sliding guide 141 from being transferred beyond the maximum movable distance by the coarse actuator 120. Further, each stopper 143 can be formed with a damper to absorb a shock when the stopper 143 comes in contact with the stopper block.

With this configuration, an operation of the transfer apparatus according to another embodiment of the present general inventive concept will be described with reference to FIGS. 7 through 9.

Figure 7:
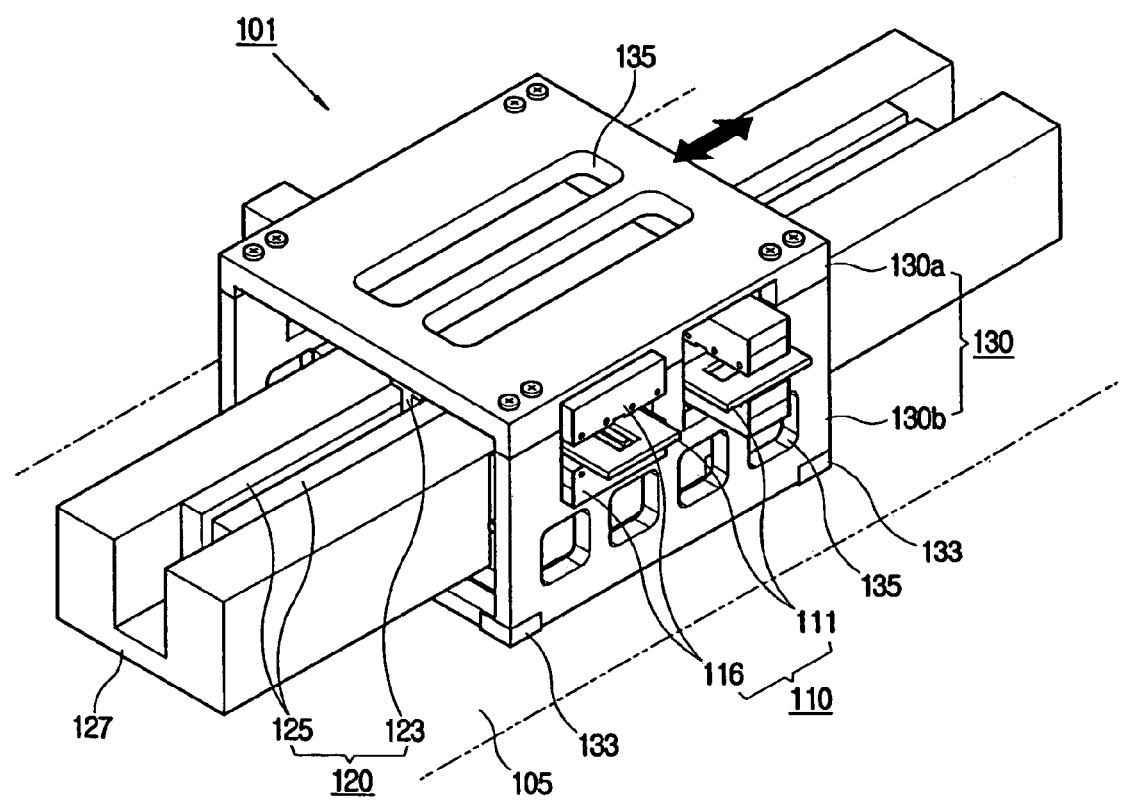
FIG. 7 is a perspective view showing an operation of a coarse actuator of the transfer apparatus of FIG. 3 according to another embodiment of the present general inventive concept.

Referring to FIG. 7, a transfer control of the coarse actuator 120 will be first described, which is more coarse than a movement control of the fine actuator 110.

First, the controller can apply the electric current to the mover 123 of the coarse actuator 120, so that the coil supporter 140 coupled with the mover 123 and the sliding guide 141 are transferred relative to the guide 127. At the same time when the electric current is applied to the coarse actuator 120, the electric current can also be applied to the coil 113 of the fine actuator 110, so that the movable magnets 117 are moved due to the electric current applied to the coils 113 when the coil supporter 140 is transferred integrally with the mover 123, thereby allowing the magnet supporter 130 to move together with the coil supporter 140.

Figure 8:
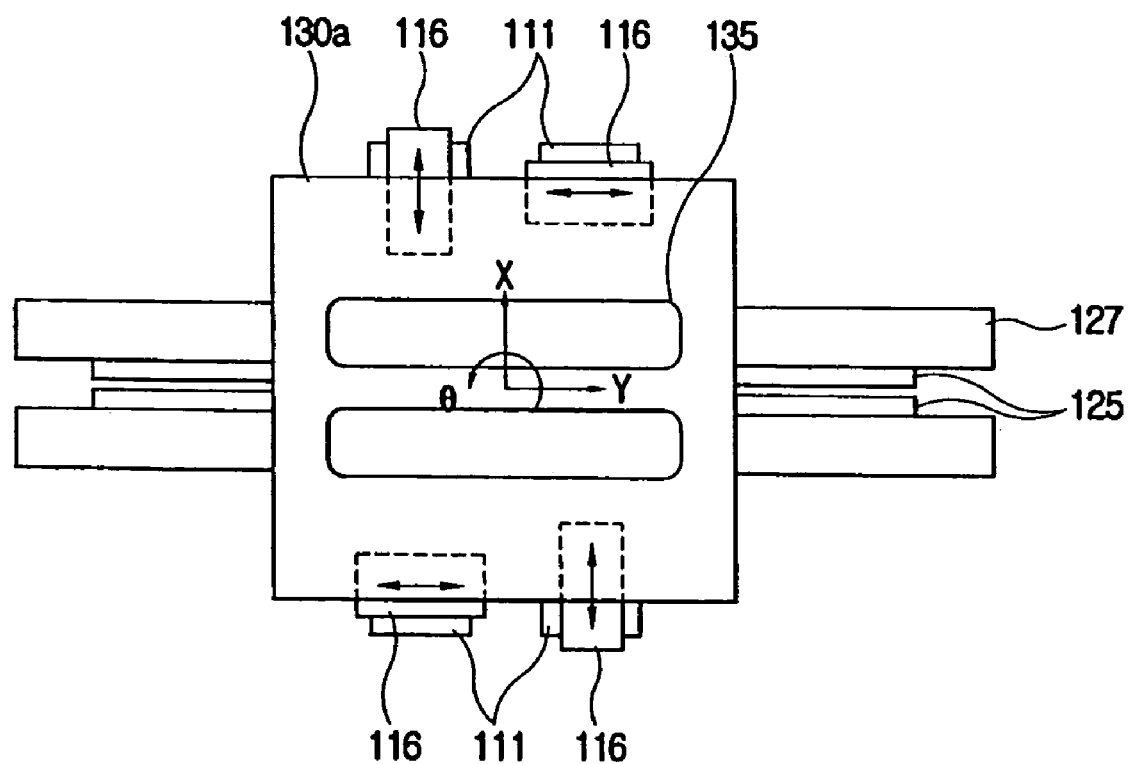
FIG. 8 is a plan view showing an operation of a fine actuator of the transfer apparatus of FIG. 3 in X- and Y-directions according to another embodiment of the present general inventive concept.
Figure 9:
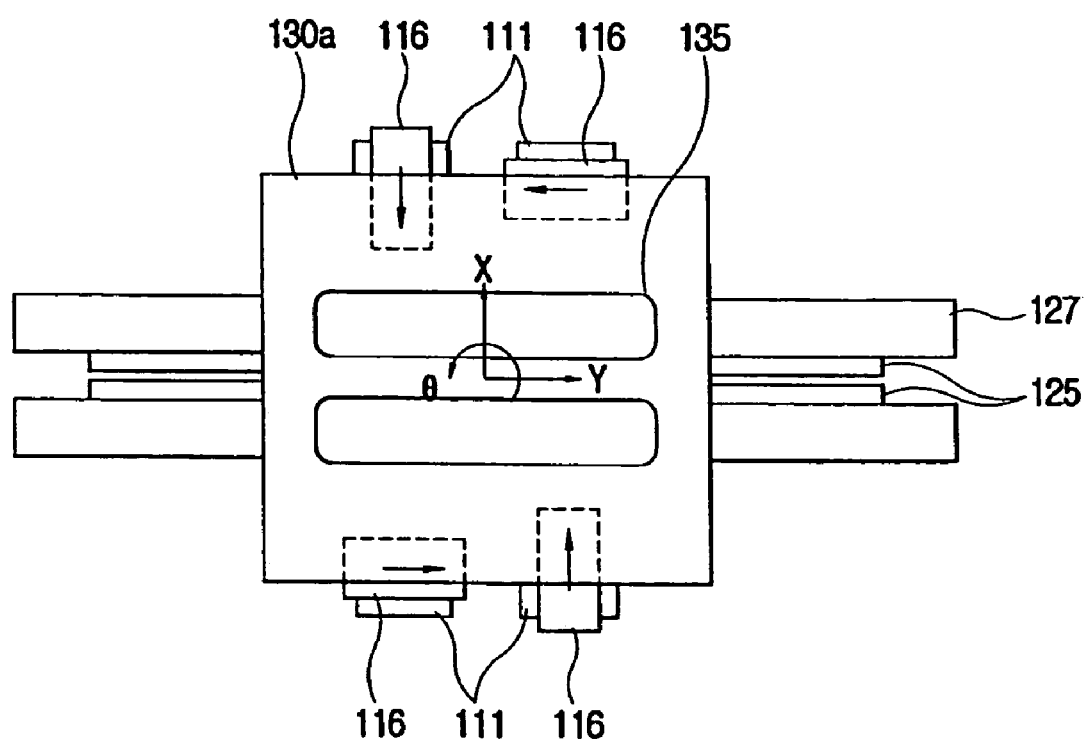
FIG. 9 is a plan view showing an operation of a fine actuator of the transfer apparatus of FIG. 3 according to another embodiment of the present general inventive concept.

Referring to FIGS. 8 and 9, a fine movement control of the fine actuator 110 will be first described. When the controller applies the electric current to the coils 113 of the fine actuator 110, the movable magnets 117 and the magnet supporter 130 supporting the movable magnets 117 can be finely moved relative to the coil supporter 140 coupled with the coil assembly 111.

To move the magnet supporter 130 relative to the coil supporter 140 in the X-direction, the controller can apply the electric current to two coil assemblies 111 among the four coil assemblies 111 to drive the movable magnet 117 to move in the X-direction. To move the magnet supporter 130 relative to the coil supporter 140 in the Y-direction, the controller can apply the electric current to two coil assemblies 111 among the four coil assemblies 111 to drive the movable magnet 117 to move in the Y-direction (refer to FIG. 8). Further, to move the magnet supporter 130 relative to the coil supporter 140 in a direction opposite to the X- or Y-direction, the controller can apply an inverse electric current to two coil assemblies 111 correspondingly selected among four coil assemblies 111.

Among four fine actuators 110 arranged rectangularly, two of the four fine actuators 110 can be employed in the X-direction movement and the other two can be employed in the Y-direction movement, so that straight movements are the same regardless of the X- or Y-direction, thereby reducing the positioning control error to get a more precise movement. That is,.when the magnet supporter 130 is driven to straight move in the X- or Y-direction, there is no driving force toward the other Y- or X-direction, thereby effectively reducing the positioning control error to move the magnet supporter 130 precisely.

Further, to rotate the magnet supporter 130 relative to the coil supporter 140 in the θ-direction, the controller can apply the electric current to all four coil assemblies 111 to drive the movable magnets 117 to rotate in the θ-direction (refer to FIG. 9). To rotate the magnet supporter 130 relative to the coil supporter 140 in a direction opposite to the θ-direction, the controller can apply an inverse electric current to the four coil assemblies 111.

Thus, the transfer apparatus according to this embodiment of the present general inventive concept may include at least four fine actuators, wherein two pairs of fine actuators are symmetrically arranged with respect to a predetermined straight line, so that straight movements are the same regardless of the X- or Y-direction and the straight movement is performed in only one direction without the straight movement of the other direction, thereby reducing a positioning control error and performing a super-precision positioning control.

As described above, the, present general inventive concept provides a transfer apparatus which can perform a super-precision positioning control by decreasing a positioning control error.

Further, the present general inventive concept provides a transfer apparatus which may include a coarse actuator connected with a fine actuator, thereby performing a movement control more coarse than that of the fine actuator.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A transfer apparatus comprising:
   at least four fine actuators each having a coil assembly having a coil and movable magnets having different polarities and spaced apart from each other to interpose the coil assembly therebetween;

a coil supporter to support the at least four coil assemblies to correspond to the coil assemblies so that the fine actuators are arranged in a pair of groups thereof symmetrically with respect to a predetermined straight line thereof;

a magnet supporter to support the at least four movable magnets corresponding to the respective coil assemblies;

a controller to control the fine actuators to move one of the coil supporter and the magnet supporter with three degrees of freedom with respect to the other one; and a guide to support the coil supporter and allow the coil supporter to move along an axis of the guide.

2. The transfer apparatus according to claim 1, wherein in each group of coil assemblies, one coil corresponding to at least one movable magnet has a current direction orthogonal to another current direction of the other coil.

3. The transfer apparatus according to claim 1, wherein the magnet supporter comprises a plurality of air bearings to control the magnet supporter to be spaced from a predetermined bottom surface and to be movable relative to the bottom surface.

4. The transfer apparatus according to claim 1, wherein the controller controls the fine actuators to move the magnet supporter relative to the coil supporter in one of an x, y, and θ direction with respect to a surface of the magnet supporter.

5. The transfer apparatus according to claim 1, wherein the magnet supporter is finely moved with respect to the coil supporter within a positioning control error of about ± 50 nm.

6. The transfer apparatus according to claim 1, further comprising a coarse actuator connected to one of the magnet supporter and the coil supporter to control the one of the magnet supporter and the coil supporter to move the one of the coil supporter and the magnet supporter more coarsely than when driven by the fine actuator.

7. The transfer apparatus according to claim 6, wherein the coarse actuator comprises:

a mover having a movable coil thereon and connected to the coil supporter; and a stator having a pair of magnets having different polarities and spaced apart from each other to interpose the mover therebetween.

8. The transfer apparatus according to claim 7, wherein the guide supports the stator, and further comprising:

a sliding guide connected to the coil supporter to be transferred together with the coil supporter along the guide.

9. The transfer apparatus according to claim 8, wherein the sliding guide comprises a plurality of second air bearings to control the sliding guide to be transferred while being spaced from the guide.

10. The transfer apparatus according to claim 8, wherein at least one of the sliding guide and the magnet supporter comprises a stopper to limit a movement of the sliding guide and the magnet supporter within a predetermined range.

11. A transfer apparatus comprising:

a guide having a stator:

a mover disposed to be spaced-apart from the guide to move along an axis of the guide with respect to the guide according to a reaction between the stator and the mover to form a coarse actuator;

a coil supporter coupled to the mover to move along the axis of the guide together with the mover with respect to the guide, and having at least four coil assemblies;

a magnet supporter spaced apart from the coil supporter, and having at least four magnet assemblies each corresponding to a respective one of the at least four coil assemblies to form a fine actuator to move with respect to the coil supporter according to a reaction between each of the coil assemblies and the at least four magnet assemblies; and a controller to control the mover of the coarse actuator in a coarse movement to move the mover with respect to the guide in a direction corresponding to the axis of the guide, and to control at least one of the coil assemblies of the fine actuator in a fine movement to move the magnet supporter with respect to the coil supporter in a direction corresponding to one of orthogonal directions and a rotating direction with respect to a center portion of the magnet supporter.

12. The transfer apparatus according to claim 11, wherein the controller controls the coil assemblies to move the magnet supporter along the coil supporter when the mover moves with respect to the guide.

13. The transfer apparatus according to claim 11, wherein the stator comprises first and second stators formed along the axis of the guide, and the mover has a predetermined length disposed between the first and second stators to move in the direction of the axis of the guide.

14. The transfer apparatus according to claim 11, wherein the coil assemblies comprise coils, and each of the magnet assembles comprises two moveable magnets disposed to correspond to each coil in a direction perpendicular to the axis of the guide.

15. The transfer apparatus according to claim 11, wherein the coil assemblies comprise coils, and each of the magnet assemblies comprises two pairs of moveable magnets each pair disposed to correspond to each coil in a direction perpendicular to the one of the orthogonal directions.

16. The transfer apparatus according to claim 11, wherein the coil assemblies comprise first and second pairs of coil assemblies to move the magnet supporter in the orthogonal directions, respectively, and in the rotating direction, the first pair of coil assemblies are disposed opposite to each other with respect to the axis of the guide, and the second pair of coil assemblies are disposed opposite to each other with respect to the axis of the guide.

17. The transfer apparatus according to claim 16, wherein one of the first and second pairs of coil assemblies comprises a pair of coils arranged in corresponding ones of the orthogonal directions, and each of the magnet assemblies comprises a plurality of movable magnets to correspond to the respective coils to move the magnet supporter in the corresponding ones of the orthogonal directions.

18. The transfer apparatus according to claim 16, wherein the first pair of coil assemblies are disposed on a first line passing through the center portion of the magnet supporter, and the second pair of coil assemblies are disposed on a second line passing through the center portion of the magnet supporter and having an angle with the first line.

19. The transfer apparatus according to claim 11, wherein the one of the orthogonal directions is parallel to the axis of the guide.

20. A transfer apparatus comprising:

a guide having a stator:

a mover disposed to be spaced-apart from the guide, having a coil to form a coarse actuator with the stator of the guide, and moving along an axis of the guide with respect to the guide according to a reaction between the stator and the coil of the mover;

a coil supporter coupled to the mover to move together with the mover along the axis of guide, and having at least four coil assemblies mounted thereon;

a magnet supporter spaced apart from the coil supporter, having a first magnet supporter and a second magnet supporter coupled to the first magnet supporter to accommodate the coil supporter, having four first magnet assemblies mounted on the first magnet supporter to be disposed to face a first side of the coil supporters, having four second magnet assemblies mounted on the second magnet supporter to be disposed to face a second side of the coil supporter, each pair of the four first magnet assemblies and the four second magnet assemblies forming a fine actuator with a corresponding one of the at least four coil assemblies to move with respect to the coil supporter according to a reaction between each of the coil assemblies and each pair of the four first magnet assemblies and the four second magnet assemblies; and a controller to control the mover of the coarse actuator and at least one of the coil assemblies in a coarse movement to move the mover with respect to the guide in a direction corresponding to the axis of the guide, and to control the four coil assemblies of the fine actuator in a fine movement to move the magnet supporter with respect to the coil supporter in a direction corresponding to one of orthogonal directions and a rotating direction with respect to a center portion of the magnet supporter.

* * * * *